United States Patent [19]
Pedersen et al.

[11] Patent Number: 4,653,851
[45] Date of Patent: Mar. 31, 1987

[54] FIRE RESISTANT FIBER OPTIC CABLE

[75] Inventors: Jack R. Pedersen, Moss; Per Thomassen, Son, both of Norway

[73] Assignee: International Standard Electric Corporation, New York, N.Y.

[21] Appl. No.: 706,581

[22] Filed: Feb. 28, 1985

[30] Foreign Application Priority Data

Mar. 22, 1984 [NL] Netherlands .......................... 841126

[51] Int. Cl.⁴ ............................................... G02B 6/44
[52] U.S. Cl. ................................................. 350/96.23
[58] Field of Search ................ 350/96.23; 174/121 A

[56] References Cited

U.S. PATENT DOCUMENTS 4,447,122  5/1984  Sutehall ........................... 350/96.23

FOREIGN PATENT DOCUMENTS 117205  9/1981  Japan ............................... 350/96.23
107607  6/1985  Japan ............................... 350/96.23

*Primary Examiner*—William L. Sikes
*Assistant Examiner*—Robert E. Wise
*Attorney, Agent, or Firm*—John T. O'Halloran; Mary C. Werner

[57] ABSTRACT

A fiber optic cable includes layers and elements for mechanical and fire protection of the cable, all having the same or substantially the same thermal coefficient of expansion as the optical fibers. The fiber optic cable core is protected against flames by at least two layers of mica separated by a layer of synthetic material.

9 Claims, 1 Drawing Figure

U.S. Patent  Mar. 31, 1987  4,653,851
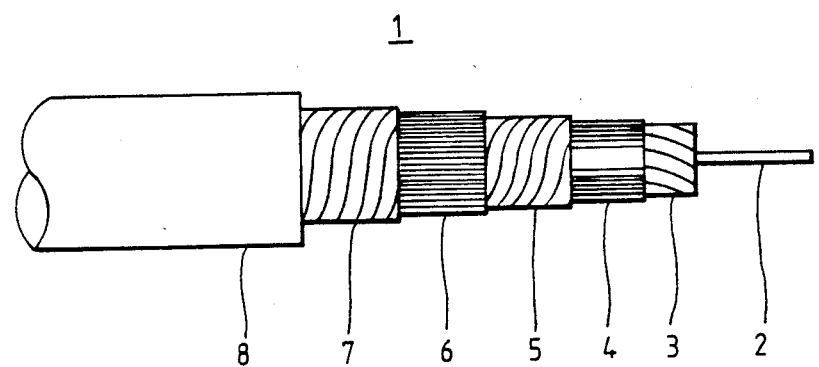

FIRE RESISTANT FIBER OPTIC CABLE

BACKGROUND OF THE INVENTION

The present invention relates to fiber optic cables and in particular to fiber optic cables which are capable of maintaining circuit integrity when subjected to fires and high temperatures.

There are known several types of cables which claim to satisfy various fire test specifications. The object of the present invention is, however, to improve the fire resistivity of fiber optic cables.

SUMMARY OF THE INVENTION

The present invention relates to a fire resistant optical fiber cable comprising a core structure including a central tensile strength member, at least one optical fiber arranged in a layer around the tensile strength member; a layer of a mica-containing material located around the core structure; a layer of a synthetic armoring material surrounding the mica-containing layer; an additional layer of a mica-containing material located around the armoring material layer; and a sheath of a self-extinguishing material surrounding the additional mica-containing layer, the core structure, the layers and the sheath having substantially the same linear thermal coefficient of expansion.

When constructing the cable of the present invention it was attempted to maintain the cable core as in ordinary fiber optic cables in order to prevent the necessity of developing new jointing methods and core designs. It was also considered important that the optical fibers were stranded onto the central tensile element with full backtwist to avoid torsional forces in the fibers.

An important feature of the cable is that it contains no metal elements like wires, bands, tapes or sheaths. Consequently, and by taking other measures, there is obtained a cable where all elements, including all elements and armoring for mechanical and fire protection, have the same or substantially the same thermal coefficient of expansion as the optical fibers. If the cable contained metal elements of any kind, experiments have shown that the life of the cable during a fire would be drastically reduced.

BRIEF DESCRIPTION OF THE PREFERRED EMBODIMENT

Above mentioned and other objects and features of the present invention will clearly appear from the following detailed description of an embodiment of the invention, taken in conjunction with the sole drawing which is a side elevational view of the cable of this invention with portions thereof gradually removed to show the various layers thereof.

DETAILED DESCRIPTION OF THE PREFERRED EMBODIMENT

In one embodiment of the invention the cable 1 includes a glass fiber reinforced plastic tensile element around which there are stranded a number of elements 3. These elements include fiber optic elements, as well as filling elements made of non-combustible material such as glass fiber strings. Each of the optical fiber elements are provided with a primary layer of silicone (tradename Sylgard 184) and a secondary cladding of Nylon (Nylon 12).

The stranded unit containing the center reinforcing element 2 and the stranded elements 3, is filled with silicone grease (AEI M 494) which is applied during the stranding process.

An optional polyester tape 4 is wound with each turn partly overlapping the next turn over the filled stranded unit to make up a silicone grease filled fiber optic cable core.

Over the cable core there is applied, also with overlap, a layer of mica tape 5 for shielding the core against direct contact with flames.

Next there is applied a layer of synthetic armoring 6 consisting of Kevlar fibers applied with a very long length of lay. Over the Kevlar armoring there is applied another layer 7 of overlapping mica tape to protect the armoring.

The purpose of the synthetic armoring 6 is in addition to provide efficient mechanical protection during handling and installation, to keep the two mica layers 5 and 7 separated in a fire situation and effectively assist in providing flame protection.

Experiments have shown that the configuration of mica tape layers 5 and 7 separated by a layer of synthetic armoring 6 adds substantially to the flame resistant properties of the cable. In each layer of mica tape or the like there may be two or more windings of tape wound with overlap. 10–50% overlap is considered to be convenient.

Finally the fire protected and armored cable core is included within an extruded sheath 8 of self-extinguishing halogen free material such as silan crosslinked polyethylene bearing the tradename AEI 19407.

The cable of the present invention has passed the following test program: a modified IEC 331, the IEC 332 part 1, as well as the DIN 57472/VDE 0742 part 813 Draft test.

It is important to point out that the existing IEC 331 test specification is not very relevant to fiber optic cables. It is not relevant to test whether the cable maintains its insulation,—it is more important to test whether the cable is capable of transferring specific information signals in a frequencdy range up to serveral MHz. We therefore had to modify the existing test specifications by connecting the fiber optic cable into a signal transmission circuit during the fire test. In this way it was possible to monitor changes in transmission attenuation as a function of temperature and time.

In the modified IEC 331 test the cable was clamped as specified and it was subjected to 750° C. for three hours without detecting any increase of the signal transmitted. The test was interrupted after three hours by manipulating the cable sample with mechanical means until the cable broke. Left alone the cable would probably operate indefinitely because the ashes of the protective layers effectively prevent flames from reaching the fibers.

In a special fire test including several types of cables, electric as well as fiber optic, the cable of the present invention proved to be the best of the fiber optic cables tested. In fact it proved to be much better than many of the electrical 'fire resistant' signalling cables tested.

As will appear from the above, the cable according to the present invention is free from any metallic wires, tapes and sneaths. This is considered to be an essential feature of the cable, but also the combination of the silicon filled core, the combined mica/Kevlar armoring and the outer halogen free sheath are considered to contribute to the good result obtained.

With reasonable and practical dimensions of the cable it will not be possible to prevent heat from reaching the cable core. The cable described above having a diameter of about 5 mm will have little heat capacity and the temperature in the core will rise rapidly, although a little delayed, as a result of a temperature rise in the environment.

As compared to cables containing metal conductors, as for instance multiconductor telephone or signal cables, and where the cable retains circuit integrity as long as the conductors are insulated from each other and from the surroundings, a vital point in connection with fiber optic cable is that the fibers must be protected from direct contact with flames. If flames reach the fiber, the signal transmission properties will be destroyed. Increased flame protection will be obtained with several alternating layers containing mica and Kevlar. The outermost mica layer could preferably be made up of two overlapped mica tapes. A main point is that all layers of the cable would be gradually turned into ashes so that flames will not reach the optical glass fibers.

In an alternative embodiment the mica/Kevlar configuration 5, 6 and 7 and space underneath the extruded sheath 8 are also filled with silicone grease of the type mentioned, or of other types.

In order to improve the temperature/time characteristics of the cable there may be introduced materials like aluminum hydroxide or other substances which are capable of releasing water of crystallization at high temperatures in the outer sheath. Such materials may also be introduced in the silicone grease/mass used to impregnate the mica/Kevlar layers.

It should be understood that the design of the core may be varied with regard to the number and configuration of the longitudinal strain relief string and the optical elements. It is also contemplated to embed the optical elements in or loosely place the same within grooves arranged on the surface of a guide member made of insulation material. Such grooves may be arranged in spiral form (helically) or in an oscillating fashion relatively to the longitudinal axis of the guide member and the cable in a so-called open groove construction. The design of the guide member must be chosen so as to minimize the risk of collapsing the grooves around the fibers. Such collapse during a fire could cause unforeseen mechanical tension in the fibers which could break. Whereas an embodiment of the invention has been described above it should be clear that instead of the mica tapes described there could be used tapes or layers with equivalent properties like glass fiber tape impregnated with self-extinguishing materials such as those based on an aluminum hydroxide filled latex.

There may also be used other synthetic fibers in combination with or as a substitute to the mentioned Kevlar armor, and finally there could be used a variety of products in the silicone grease filling. The outer sheath described as being of polyethylene could also be made of alternative halogen free materials.

While we have described above the principles of our invention in connection with specific apparatus, it is to be clearly understood that this description is made only by way of example and not as a limitation to the scope of our invention as set forth in the objects thereof and in the accompanying claims.

We claim:
1. A fire resistant optical fiber cable comprising:
    a core structure including
        a central tensile strength member
        at least one optical fiber arranged in a layer around said tensile strength member;
    a layer of a mica-containing material located around said core structure;
    a layer of a synthetic armoring material surrounding said mica-containing layer;
    an additional layer of a mica-containing material located around said armoring material layer; and
    a sheath of a self-extinguishing material surrounding said additional mica-containing layer,
    said core structure, said layers and said sheath having substantially the same linear thermal coefficient of expansion.
2. Tne cable as claimed in claim 1 wherein said core structure further includes filler elements of non-combustible material included in said optical fiber layer.
3. The cable as claim 1 wherein said core filler elements and said optical fiber have a back twisted configuration around said tensile strength element to prevent torsional forces in said optical fiber.
4. The cable as claimed in claim 2 wherein said core structure further includes at least one layer of a material which stabilizes the core configuration and insures prolonged circuit integrity during high temperature conditions.
5. The cable as claimed in claim 4 wherein said material is a polyester tape.
6. The cable as claimed in claim 1 wherein said core structure further includes a silicone grease.
7. The cable as claimed in claim 1 wherein said armoring material layer is in the form of either one of a winding and a braiding having a long length of lay.
8. The cable as claimed in claim 1 wherein each of said mica-containing material layers is a tape wound with 10–50% overlap.
9. The cable as claimed in claim 1 wherein said additional mica-containing material layer includes a composite of at least two mica tapes.

* * * * *